US012696172B2

(12) United States Patent
Narasimhamurthy et al.

(10) Patent No.: US 12,696,172 B2
(45) Date of Patent: Jul. 28, 2026

(54) DIFFERENTIATING THE FOREGROUND AND BACKGROUND DATA TRAFFIC OVER A NETWORK SLICE

(71) Applicant: Apple Inc., Cupertino, CA (US)

(72) Inventors: Srinivas Kote Narasimhamurthy, San Marcos, CA (US); Oleg M. Moskalenko, Ben Lomond, CA (US); Muthukumaran Dhanapal, San Diego, CA (US); Ying Huang, San Diego, CA (US); Ajoy K. Singh, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 18/591,793

(22) Filed: Feb. 29, 2024

(65) Prior Publication Data

US 2025/0280351 A1     Sep. 4, 2025

(51) Int. Cl.
*H04W 74/08*      (2024.01)
*H04L 67/145*     (2022.01)
*H04W 40/02*      (2009.01)
*H04W 40/28*      (2009.01)

(52) U.S. Cl.
CPC ........... *H04W 40/28* (2013.01); *H04L 67/145* (2013.01); *H04W 40/02* (2013.01)

(58) Field of Classification Search
CPC ..... H04W 40/28; H04W 40/02; H04W 76/38; H04W 76/12; H04W 48/18; H04W 12/06; H04W 76/20; H04W 48/16; H04L 67/145
See application file for complete search history.

(56) References Cited

U.S. PATENT DOCUMENTS

| | | | |
|---|---|---|---|
| 2015/0319144 A1* | 11/2015 | Barton ................... | G06F 9/544 |
| | | | 713/168 |
| 2018/0262388 A1* | 9/2018 | Johnson ................. | H04W 4/70 |
| 2021/0337481 A1* | 10/2021 | Goel ................. | H04W 52/0229 |

* cited by examiner

*Primary Examiner* — Phuoc H Doan
(74) *Attorney, Agent, or Firm* — Sterne, Kessler, Goldstein & Fox P.L.L.C.

(57)        ABSTRACT

A user equipment (UE) for differentiating the foreground and background data traffic over a network slice is provided. The UE operates by determining whether an application running in a foreground state transitions to running in a background state, where traffic corresponding to the application running in the foreground state is routed over a dedicated network slice. In response to a determination that the application running in the foreground state transitions to running in the background state, start a first timer and route background traffic corresponding to the application over the dedicated network slice. Next, in response to a determination that the first timer has expired and a determination that the application continues to run in the background state, start a second timer and start routing the background traffic corresponding to the application over a default network slice. Finally, in response to a determination that the second timer has expired and that the application continues to run in the background state, continue to route the background traffic corresponding to the application over the default network slice and release resources corresponding to the dedicated network slice.

20 Claims, 6 Drawing Sheets

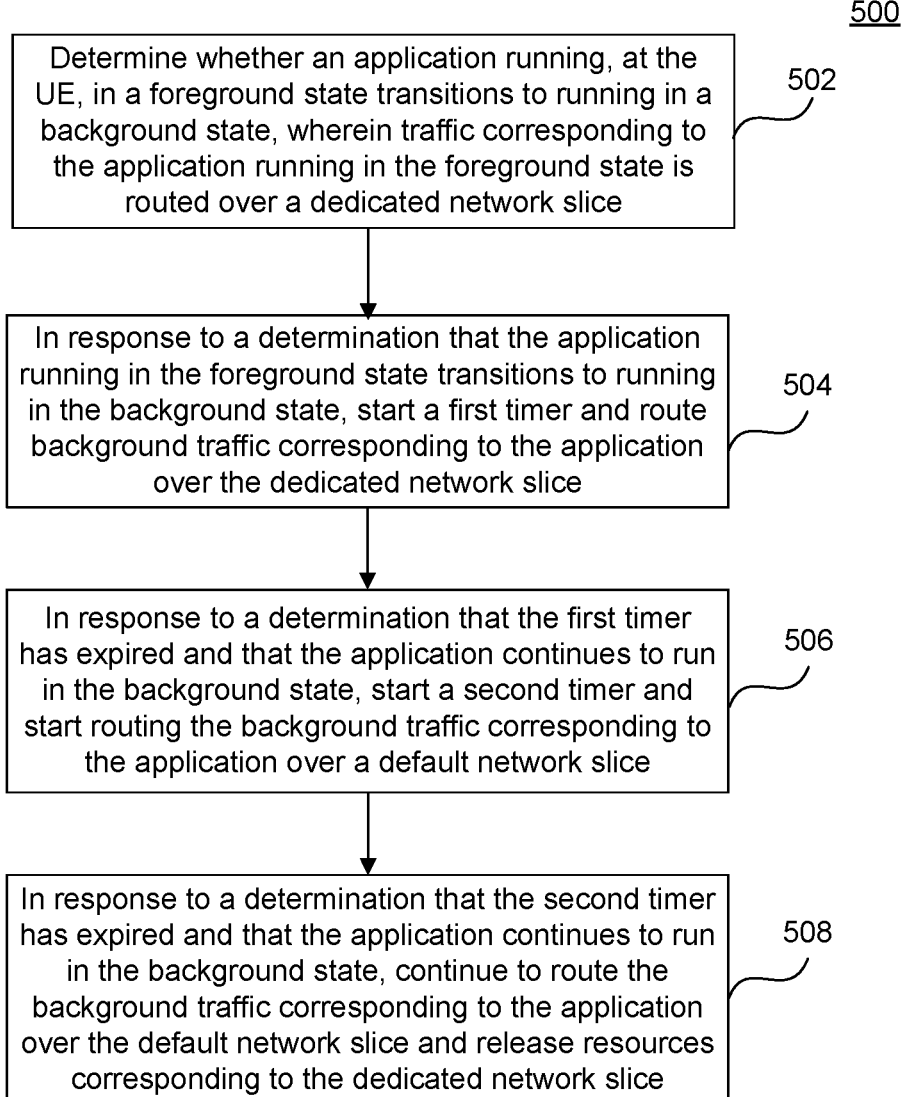

500

Determine whether an application running, at the UE, in a foreground state transitions to running in a background state, wherein traffic corresponding to the application running in the foreground state is routed over a dedicated network slice

502

In response to a determination that the application running in the foreground state transitions to running in the background state, start a first timer and route background traffic corresponding to the application over the dedicated network slice

504

In response to a determination that the first timer has expired and that the application continues to run in the background state, start a second timer and start routing the background traffic corresponding to the application over a default network slice

506

In response to a determination that the second timer has expired and that the application continues to run in the background state, continue to route the background traffic corresponding to the application over the default network slice and release resources corresponding to the dedicated network slice

DIFFERENTIATING THE FOREGROUND AND BACKGROUND DATA TRAFFIC OVER A NETWORK SLICE

BACKGROUND

Field

The described aspects generally relate to techniques for implementing network slicing in a wireless communication system.

Related Art

5G New Radio (NR) in wireless communications supports a wide range of use cases and applications operating over various bandwidths along with a diverse set of user equipments (UEs) with different performance and latency requirements. Network slicing is a key architectural concept and technology that enables the creation of multiple virtualized, independent, and logically isolated network instances or slices within a single physical 5G network infrastructure. Each network slice can be customized to meet the specific requirements of different services or applications, or user groups, allowing for efficient resource allocation, optimized performance, and diverse use cases within a shared network.

SUMMARY

Some aspects of this disclosure relate to apparatuses and methods for differentiating foreground and background traffic over a network slice. For example, some aspects of this disclosure relate to configuring a UE to route traffic corresponding to an application over a default network slice if the application transitions from a foreground state to a background state.

Some aspects of this disclosure relate to a UE that has a transceiver configured to enable wireless communication with a base station, and a processor communicatively coupled to the transceiver. The processor is configured to determine whether an application running in a foreground state transitions to running in a background state, where traffic corresponding to the application running in the foreground state is routed over a dedicated network slice. In response to a determination that the application running in the foreground state transitions to running in the background state, the processor is configured to start a first timer and route background traffic corresponding to the application over the dedicated network slice. Next, in response to a determination that the first timer has expired and in response to a determination that the application continues to run in the background state, the processor is configured to start a second timer and start routing the background traffic corresponding to the application over a default network slice. Finally, in response to a determination that the second timer has expired and that the application continues to run in the background state, the processor is configured to continue to route the background traffic corresponding to the application over the default network slice and release resources corresponding to the dedicated network slice.

According to some aspects, in response to a determination that the first timer has expired and that the application has transitioned back to the foreground state, the processor is further configured to route traffic corresponding to the application over the dedicated network slice. According to some aspects, in response to a determination that the second timer has expired and that the application has transitioned back to the foreground state, the processor is further configured to send a request to establish a new dedicated network slice that is different from the dedicated network slice. According to some aspects, the duration of at least one of the first timer or the second timer is determined, in part, based on a number of currently active dedicated network slices at the UE. According to some aspects, the background traffic corresponding to the application running in the background state comprises of internet control message protocol (ICMP) keep-alive messages. According to some aspects, a user interface (UI) application of the UE indicates whether the application is running in the foreground state or in the background state. According to some aspects, the UE determines that the application is running in the background state based on the traffic corresponding to the application not comprising any data packets of size greater than a threshold value. According to some aspects, the dedicated network slice is an enhanced mobile broadband (eMBB) network slice, a ultra-reliable low latency communications (URLLC) network slice, or a massive machine type communications (mMTC) network slice.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 5 illustrates another exemplary method performed by a UE differentiating the foreground and background data traffic over a network slice, according to some aspects of this disclosure.

Figure 1:
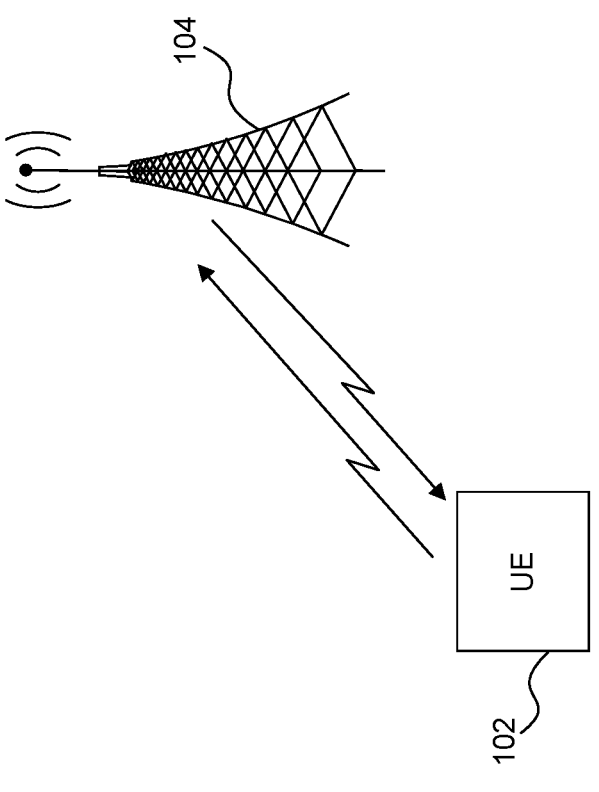
FIG. 1 illustrates an example wireless system implementing techniques for differentiating the foreground and background data traffic over a network slice, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Use case scenarios for 5G NR include eMBB, URLLC, and mMTC. These use cases cover a wide range of applications with highly diverse requirements. For example, eMBB is designed to cater to the large capacities needed to accommodate high user density scenarios, mMTC services are characterized by a massive number of sensors or connected devices that typically transmit low volume of non-delay sensitive data, and URLLC services refer to services that are expected to have exceptionally low latency and extremely high reliability.

Network slicing provides a solution to meet the requirements of all use cases using a common physical network infrastructure. The network infrastructure is divided into multiple network slices to cater to the diverse requirements of various application and services. The 5G NR defines single network slice selection assistance information (S-NSSAI) to uniquely identify a network slice. An S-NSSAI is made up of two fields: SST slice service type (SST) and service differentiator (SD). SST defines the expected behavior of the network slice in terms of specific features and services and SD is an optional field.

A set of network slices that the 5G core network has authorized for a specific UE is called an Allowed NSSAI. Under the current 3rd Generation Partnership Project (3GPP) standard, there can be a maximum of eight network slices within an Allowed NSSAI. Hence, a single UE can be served by a maximum of eight dedicated network slices. Using all eight network slices would require the UE to establish eight protocol data unit (PDU) sessions. Furthermore, if a UE using eight dedicated network slices establishes a new PDU session (i.e., a ninth PDU session), the ninth PDU session will be assigned a default network slice instead of a dedicated network slice. However, a default network slice only provides basic connectivity (e.g., best-effort connectivity), and the service requirements of the ninth PDU session may not be met.

An application running at a UE in the foreground may generate data traffic that requires a particular type of service (e.g. quality of service), and hence needs a dedicated network slice to support the data traffic at the particular type of service. An application running in the foreground using a dedicated network slice may move to a background state over time. When an application transitions to a background state, it generates traffic that only requires a best-effort service (e.g., keep-alive packets) that is lower than that of the service required in the foreground, and therefore the application in the background may no longer need a dedicated network slice. Furthermore, once in the background, the network resources corresponding to the dedicated network slice are typically underutilized. And underutilized network resources held by the application in the background state will remain unavailable to new foreground applications resulting in a degraded quality of service at the UE.

To address the above technological issues, embodiments herein provide techniques for improving the utilization of dedicated network slices that a UE can use by differentiating between foreground and background application traffic, according to some aspects of the disclosure. Some aspects of the disclosure relate to configuring a UE to route traffic corresponding to an application over a default network slice once the application transitions from a foreground state to a background state. Network resources corresponding to a dedicated network slice assigned to an application are released if the application remains in the background beyond a particular time duration as determined by a first timer and a second timer.

FIG. 1 illustrates an example wireless system 100 implementing enhanced configured grant transmission, according to some aspects of the disclosure. The example wireless system 100 is provided for the purpose of illustration only and does not limit the disclosed aspects. Wireless system 100 may include, but is not limited to, a base station 104 and a UE 102.

According to some aspects, base station 104 can be a fixed station or a mobile station. Base station 104 may be referred to as a cellular IoT base station, an evolved NodeB (eNB), a next generation node B (gNB), a 5G node B (NB), or some other equivalent terminology. In some examples, base station 104 can be interconnected to one or more other base stations or network nodes in a network through various types of backhaul interfaces such as a direct physical connection, a virtual network, and/or the like, not shown.

According to some aspects, UE 102 can be configured to operate based on a wide variety of wireless communication techniques. These techniques can include, but are not limited to, techniques based on 3rd Generation Partnership Project (3GPP) standards. UE 102 can be stationary or mobile. UE 102 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include a robot, a drone, a location tag, and/or the like. Furthermore, UE 102 can be an augmented reality device, a virtual reality device, a mixed reality device, or the like.

According to some aspects, UE 102 is capable of communicating with one or more base stations of the wireless system 100. According to some aspects, wireless system 100 may utilize one or more radio access technologies (RATs) and may have overlapping coverage from one or more RATs. According to some aspects, base station 104 is an NR base station. An NR radio access network (RAN) includes NR base stations and a new radio core network (CN). An NR base station can be a next generation node B (gNode B). UE 102 can access an external network via an NR base station and the NR CN.

According to some aspects, UE 102 accesses multiple network slices over base station 104. A network slice is defined within a public land mobile network (PLMN) and includes resources from both the access network (e.g., NG-RAN) and the core network. A network slice is identified by its S-NSSAI which is a concatenation of an 8-bit SST and a 24-bit slice differentiator. Furthermore, a set of one or more S-NSSAI is referred to as an NSSAI. 3GPP has defined several categories of NSSAI, including configured NSSAI, allowed NSSAI, requested NSSAI, and rejected NSSAI. Allowed NSSAI is a set of S-NSSAI that the core network has authorized for a particular UE 102. There can be up to eight network slices within an allowed NSSAI, and hence UE 102 can be served by up to eight network slices. Furthermore, using all eight network slices would require the UE to establish eight PDU Sessions.

For each application running at UE 102, one or more PDU sessions are established to provide end-to-end connectivity between UE 102 and a data network. An application can run in a foreground state or in a background state of UE 102. An application running in the foreground state is referred to as a foreground application. According to some aspects, a foreground application occupies a portion of the user interface (UI) of UE 102 and may be in a state to receive external input. Also, applications running in the foreground state may actively transmit and/or receive data traffic with a core network, including user data traffic, generated by or intended for, a user of the UE. An application running in the background state is referred to as a background application. According to some aspects, an application running in the background state may not be actively transmitting data traffic, including user data traffic. Instead, an application running in the background state may be transmitting and/or receiving internet control messaging protocol (ICMP) packets (e.g., keep-alive packets) and/or packets corresponding to other signaling protocols.

Each PDU session of an application is assigned a network slice. An application running in the foreground using a dedicated network slice may move to a background state, based on lack of user input or responsive to an intentional user action. When an application transitions to a background state, it generates traffic that only requires a best-effort service (e.g., keep-alive packets), and may no longer need a dedicated network slice to provide a specific service level. Furthermore, any underutilized network resources corresponding to the dedicated network slice held by the application in the background state will remain unavailable to new foreground applications resulting in a degraded quality of service at the UE.

According to some aspects, once UE 102 reaches a limit on the maximum number of dedicated slices (e.g., a limit of eight network slices per UE), subsequently established PDU sessions cannot be assigned dedicated network slices that provide corresponding specific service levels. Instead, they are assigned a default network slice. However, the default network slice provides basic connectivity (e.g., best-effort connectivity), and the service requirements of the subsequently established PDU session may not be met. Furthermore, the network resources corresponding to the dedicated network slice assigned to an application that has transitioned from the foreground state to the background state remain unavailable to newer foreground applications resulting in an inefficient network slice allocation and utilization.

Embodiment herein describes differentiating between foreground and background traffic to improve the utilization of dedicated network slices by the applications running at UE 102, according to some aspects of the disclosure. According to some aspects, UE 102 is configured to determine whether an application, which is running in a foreground state using a dedicated network slice, transitions to running in a background state. In response to a determination that the application running in the foreground state transitions to running in the background state, UE 102 starts a first timer and continues to route the background traffic corresponding to the application over the dedicated network slice. Next, in response to a determination that the first timer has expired and in response to a determination that the application continues to run in the background state, the UE is configured to start a second timer and starts routing the background traffic corresponding to the application over a default network slice, but continues to hold resources assigned for the dedicated network slice. Herein, resources can be time and frequency resource elements utilized for wireless signal transmission with the network. Finally, in response to a determination that the second timer has expired and that the application continues to run in the background state, the UE is configured to continue routing the background traffic corresponding to the application over the default network slice and release resources corresponding to the dedicated network slice.

Figure 2:
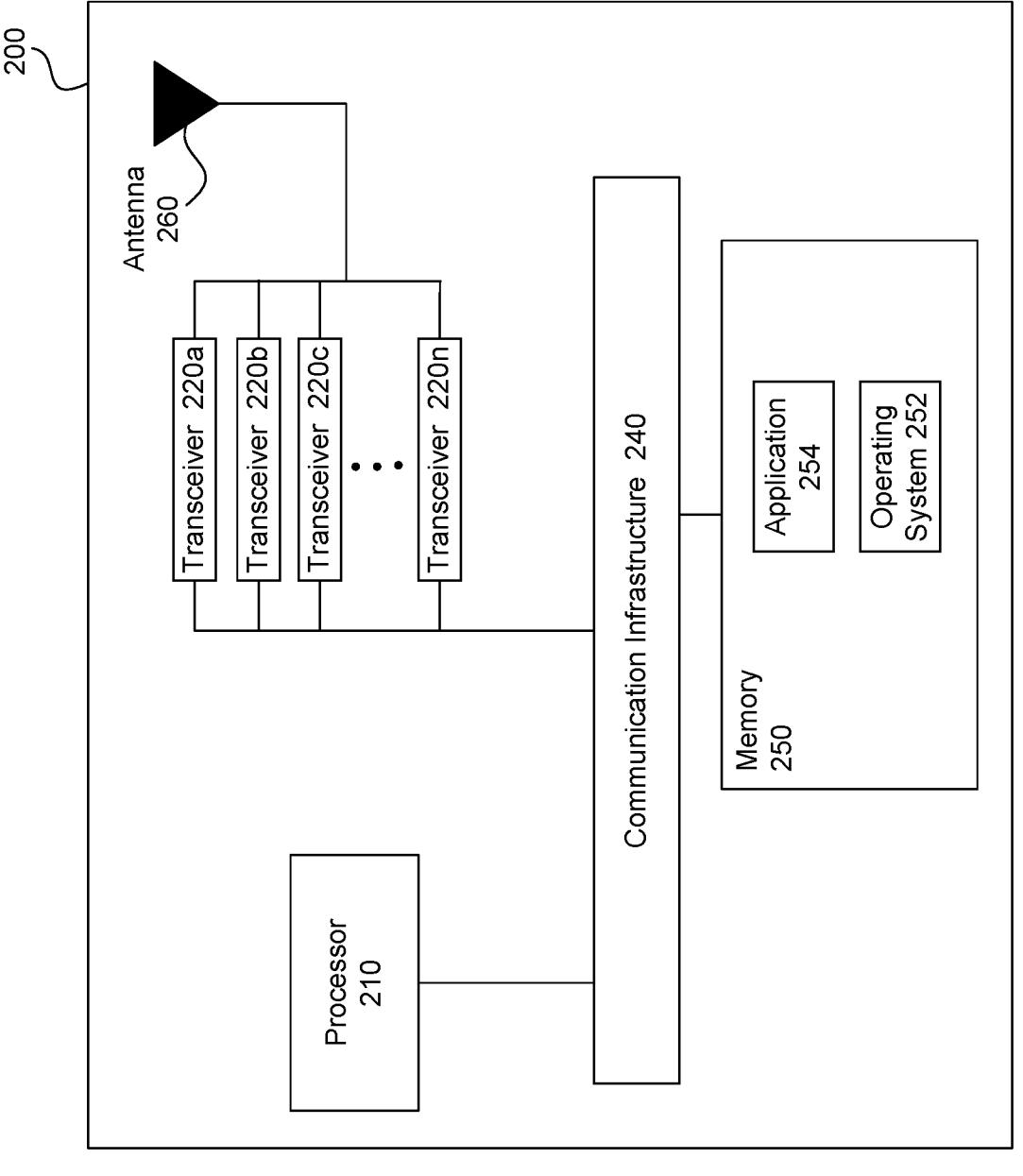
FIG. 2 illustrates a block diagram of an example system of an electronic device implementing techniques to differentiate the foreground and background data traffic over a network slice, according to some aspects of the disclosure.

FIG. 2 illustrates a block diagram of an example system 200 of an electronic device implementing techniques for differentiating foreground and background traffic over a network slice, according to some aspects of the disclosure. System 200 may be represent UE 102 of system 100. System 200 includes processor 210, UICC processor 230, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although system 200 is illustrated to include separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with computer instructions stored in memory 250 performs operations enabling system 200 of system 100 to implement techniques for differentiating foreground and background traffic over a network slice. Alternatively, processor 210 can be "hard-coded" to implement techniques for differentiating foreground and background traffic over a network slice, as described herein.

One or more transceivers 220a-220n transmit and receive communications signals and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, amplifiers, filters, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks such as 5G NR and the like. For example, one or more transceivers 220a-220n can be configured to operate according to one or more of Rel-15, Rel-16, Rel-17, or other of the 3GPP standards.

Figure 3:
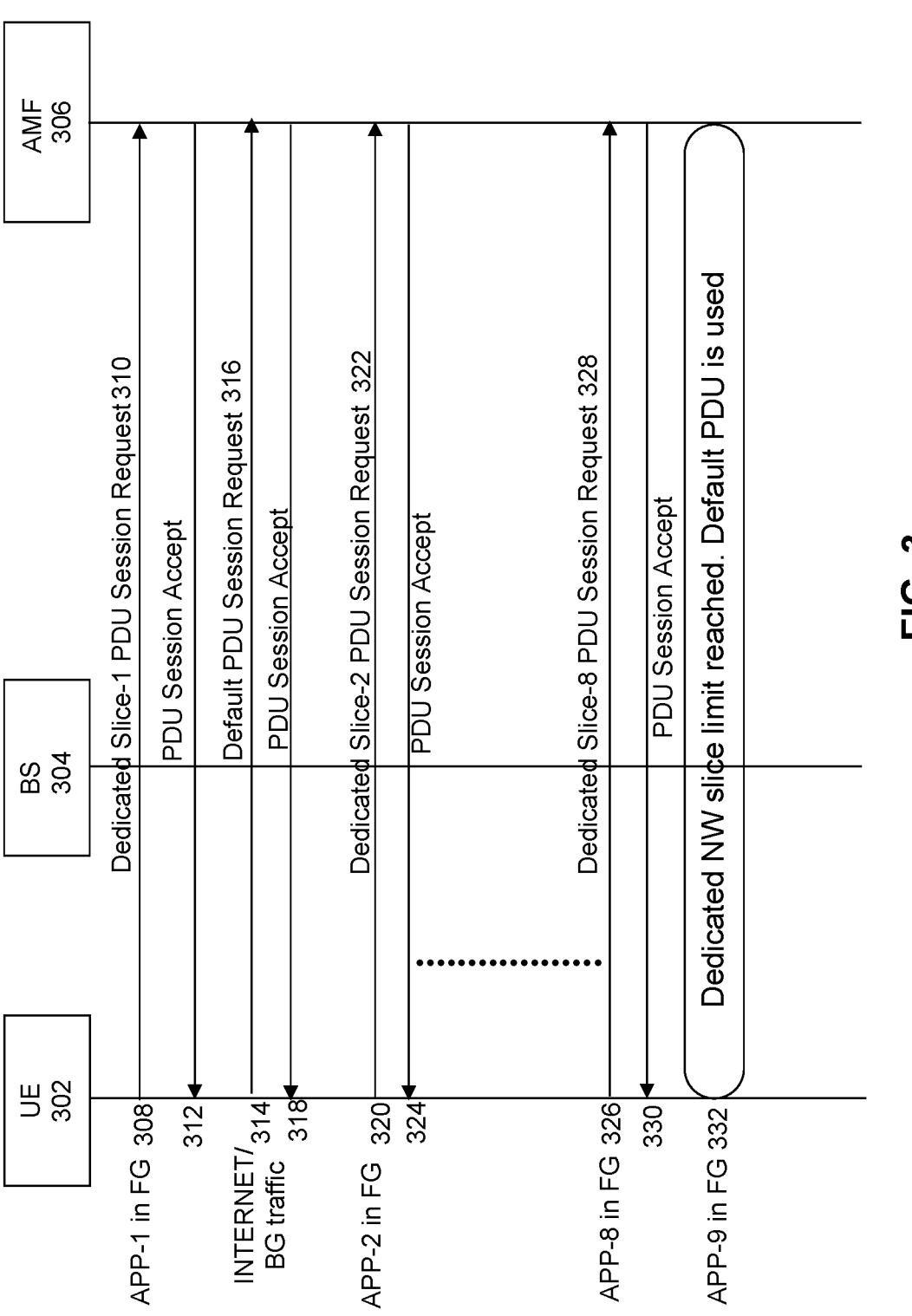
FIG. 3 illustrates an example case in which a limit on the maximum number of dedicated network slices that can serve a single UE is reached, according to some aspects of this disclosure.

FIG. 3 illustrates an example case in which a UE reaches a limit on the maximum number of dedicated network slices that it can be served by, according to some aspects of this disclosure.

According to some aspects, an application running at a UE has an associated PDU session to provide end-to-end connectivity between the UE and a data network, and a network slice is allotted by the data network to the PDU session to transmit data traffic to and from the application. In the example of FIG. 3, UE 302 communicates, via BS 304, with access and mobility management function (AMF) 306 to establish a PDU session and allot a network slice for each application. According to some aspects, the applications referred to in the example of FIG. 3 may correspond to application 254 of FIG. 2, and may include applications such as, but not limited to, radio streaming, video streaming, remote control, eMBB applications, URLLC applications, mMTC applications, and/or other user applications.

At 308, a user of UE 302 starts a first application that runs in the foreground state. UE 302 then transmits a PDU session establishment request message 310 to establish a PDU session for the first application. If the traffic generated by the first application requires a specific type of service (e.g. quality of service), UE 302 requests a network slice that meets the service type requirements of the first application. For example, if the first application is a URLLC application, UE 302 requests a network slice that provides low latency. Similarly, if the first application is an eMBB application, UE 302 requests a high-capacity network slice.

According to some aspects, UE 302 requests a specific network slice for the PDU session corresponding to the first application by sending an S-NSSAI along with the non-access stratum (NAS) message that includes the PDU session establishment request. The S-NSSAI corresponds to the network slice that UE 302 would like to have allocated for the PDU session to meet the service type requirements of the first application. AMF 306 receives the PDU session establishment request message 310, selects an appropriate session management function (SMF) based on the requested S-NSSAI, and forwards the PDU session establishment request to the SMF. The SMF then establishes a PDU session and allots the requested network slice to the PDU session.

At 312, UE 302 receives a PDU session establishment accept message corresponding to the PDU session establishment request message 310. The PDU session establishment accept message includes the S-NSSAI of the network slice that is allocated to the PDU session that is established for the first application.

At 314, UE 302 generates background traffic (e.g., Internet traffic and/or background application traffic), which does not require a specific type of service. UE 302 then transmits PDU session establishment request message 316 to request a PDU session for the background traffic. According to some aspects, since the background traffic does not require any specific type of service, UE 302 does not include an S-NSSAI along with the PDU session establishment request message 316. In response to receiving a PDU session establishment request without an S-NSSAI, the network establishes a PDU session and assigns a default network slice for the background traffic.

At 318, UE 302 receives a PDU session establishment accept message corresponding to the PDU session establishment request message 316. The PDU session establishment accept message indicates that the default network slice is assigned to the PDU session established for the background traffic.

At 320, the user of UE 302 starts a second application that runs in the foreground state. UE 302 then transmits a PDU session establishment request message 322 to establish a PDU session for the second application. If the traffic generated by the second application requires a specific type of service (e.g. quality of service), UE 302 requests a network slice for the PDU session that meets the service type requirements of the second application.

According to some aspects, UE 302 requests a specific network slice for the PDU session corresponding to the second application by sending an S-NSSAI along with the NAS message that includes the PDU session establishment request. The S-NSSAI corresponds to the network slice that UE 302 would like to have allocated to the PDU session to meet the service type requirements of the second application. AMF 306, along with an appropriate SMF, establishes a PDU session and allots the requested network slice corresponding to the requested S-NSSAI for the second application.

At 324, UE 302 receives a PDU session establishment accept message corresponding to the PDU session establishment request message 322. The PDU session establishment accept message includes the S-NSSAI of the network slice that is allocated to the PDU session that is established for the second application.

At 326, UE 302 has seven applications running in the foreground state, and the user launches an eighth application. UE 302 transmits a PDU session establishment request message 328 to establish a PDU session for the eighth application. If the traffic generated by the eighth application requires a specific type of service, UE 302 requests a network slice for the PDU session that meets the service type (e.g. quality of service) requirements of the eighth application. According to some aspects, UE 302 requests a specific network slice for the PDU session corresponding to the eighth application by including an S-NSSAI within the PDU Session Establishment request.

At 330, UE 302 receives a PDU session establishment accept message corresponding to the PDU session establishment request message 328. The PDU session establishment accept message includes the S-NSSAI of the network slice that is allocated to the PDU session that is established for the eighth application.

At 332, UE 302 has eight applications running in the foreground, with each application having a dedicated network slice allocated to it, and a user of UE 302 starts a ninth application running in the foreground. In the example of FIG. 3, UE 302 can be served by a maximum of eight dedicated network slices. Since UE 302 has reached the maximum number of dedicated network slices, a new dedicated network slice that meets the service type requirements of the ninth application cannot be assigned. The ninth application is, therefore, assigned a default network slice instead of a dedicated network slice. However, the default network slice only provides basic connectivity (e.g., best-effort connectivity) and may not meet the service requirements of the ninth PDU session may not be met.

Furthermore, if any of the applications running at UE 302 transitions to a background state, the application in the background state generates traffic that only requires a best-effort service (e.g., keep-alive packets), and may no longer need a dedicated network slice. The underutilized network resources corresponding to the dedicated network slice held by the application in the background state will remain unavailable to new foreground applications.

Embodiments herein describe techniques for improving the utilization of the dedicated network slices by differentiating between foreground and background traffic, according to some aspects of the disclosure.

Figure 4:
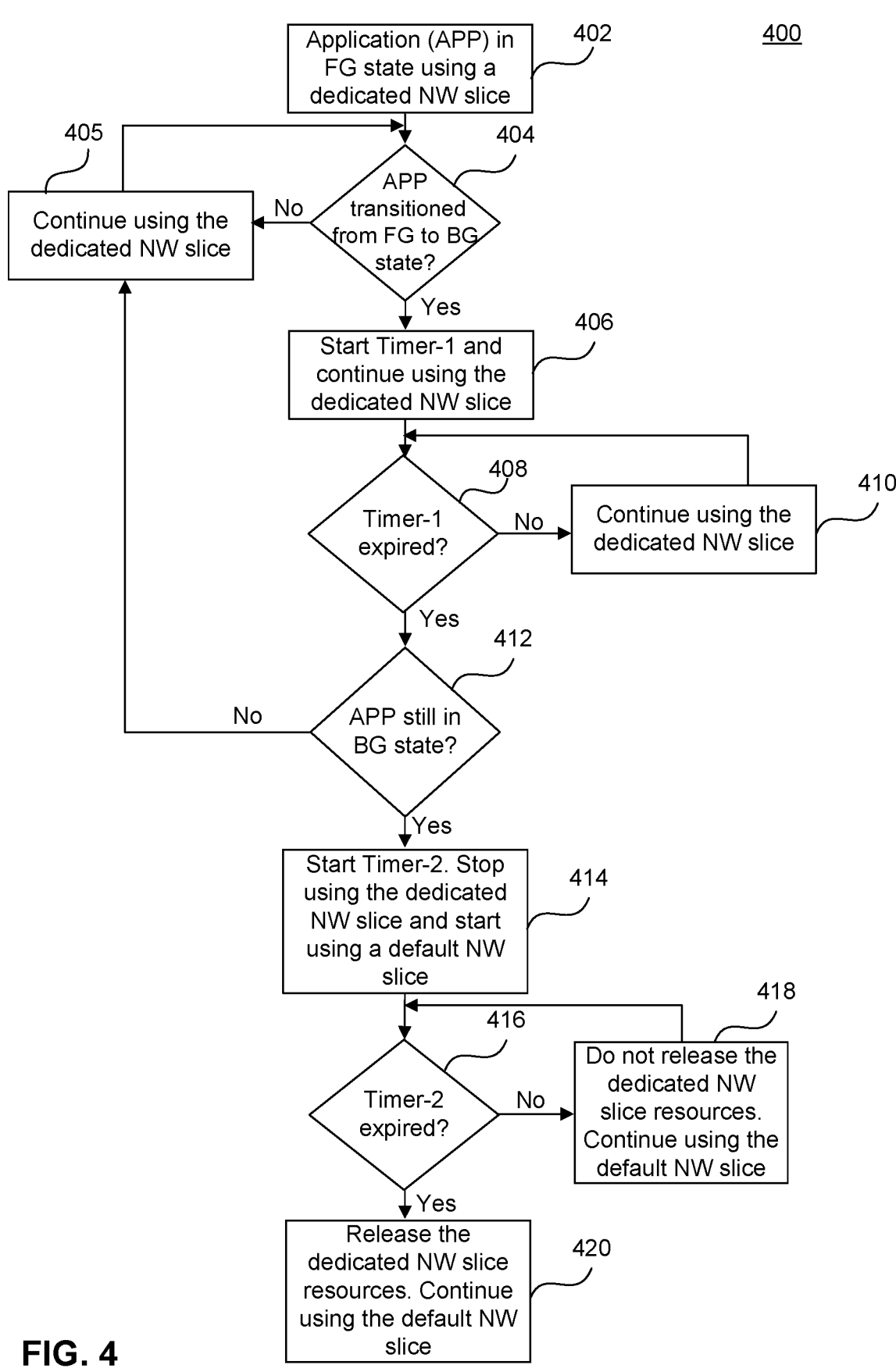
FIG. 4 illustrates an exemplary method performed by a UE differentiating the foreground and background data traffic over a network slice, according to some aspects of this disclosure.

FIG. 4 illustrates an exemplary method 400 performed by a UE for differentiating foreground and background data traffic over a network slice, according to some aspects of this disclosure. As a convenience and not a limitation, FIG. 4 may be described with regard to elements of FIGS. 1-3, for example, the functions of FIG. 4 can be performed by UE 102 of FIG. 1 or UE 302 of FIG. 3. For example, processor 210 can perform, or cause to perform, the functions of FIG. 4 in conjunction with other elements of FIG. 2. Method 400 can also be performed by system 200 of FIG. 2 and/or computer system 600 of FIG. 6. But method 400 is not limited to the specific aspects depicted in those figures, and other systems may be used to perform the method as will be understood by those skilled in the art. It is to be appreciated that not all operations may be needed, and the operations may not be performed in the same order as shown in FIG. 4.

At 402, UE 102 has an application running in the foreground. The PDU session corresponding to the application is assigned a dedicated network slice that meets the application's service type requirements (e.g., quality of service requirements). As an example and not as a limitation, UE 302 can be served by a maximum of eight dedicated network slices. Hence, at 402, the number of applications running in the foreground state at UE 102 and served by dedicated network slices is less than or equal to eight. However, the limit on the maximum number of dedicated network slices that can serve a single UE may depend on the network implementation, and other values are possible (e.g., a UE may be served by a maximum of 4, 6, 10, 12, 14, or 16 slices).

At 404, UE 102 determines whether the application has transitioned from the foreground state to the background state. According to some aspects, the application running in the foreground state actively transmits and receives data traffic, including data traffic generated by or intended for, a user. Furthermore, an application running in the foreground state occupies a portion of the UI of UE 102 and may be in a state to receive external input. However, an application running in the background state may be transmitting control or signaling packets (e.g., ICMP keep-alive packets, ping packets) only and/or packets corresponding to other signaling protocols.

According to some aspects, UE 102 may determine whether an application is in the foreground or in the background by monitoring the size and the type of packets sent by the application. For example, if the application transmits HTTP packets or packets corresponding to a streaming or multimedia protocol, the application may be running in the foreground state. If the application only transmits control packets, such as ICMP or ping packets, the application may be running in the background state. According to some aspects, if the traffic generated by the application comprises data packets of size greater than a predetermined threshold, the UE determines that the application is running in the foreground state. If the UE determines the traffic data packets are of a size less than the predetermined threshold, then the application is determined to be running in the background state. As an example, the threshold value may equal the maximum possible size of an ICMP packet. Hence, if the traffic generated by the application comprises data packets of size greater than the largest possible ICMP packets, UE 102 determines that the application is running in the foreground state.

If the application has not transitioned to the background state but instead remains in the foreground state, the process moves to 405. At 405, the application continues to use the dedicated slice until it transitions to a background state. Once the application transitions from the foreground state to the background state, the process moves to 406.

At 406, in response to a determination that the application has transitioned from the foreground state to the background state, UE 102 starts a first timer and continues to monitor whether the application remains in the background state or whether the application has transitioned back to the foreground state. According to some aspects, the duration of the first timer may depend on the number applications that are running at UE 102 in the foreground state. In other words, the duration of the first timer may depend on the number of dedicated network slices currently serving UE 102. According to some aspects, the duration of the first timer may be inversely proportional to the number of dedicated network slices currently serving the UE 102. For example, if the number of foreground applications is close to the maximum number of allowed dedicated network slices (e.g., 7 or 8), the duration of the first timer may be set to 15 seconds. If the number of applications running the foreground state is less (e.g., 1, 2, or 3), the duration of the first timer may be set to 45 seconds. If the number of foreground applications is 4, 5, or 6, the duration of the first timer may be set to 30 seconds. According to some aspects, the first timer serves the purpose of preventing method 400 from proceeding to subsequent steps when the application oscillates between the background and foreground states for example over a short time period.

At 408, UE 102 determines whether the first timer has expired. If the first timer has expired, the method continues to 412. Alternatively, the method remains at 410 until the first timer has expired. At 410, the application continues using the dedicated slice in response to a determination that the first timer has not expired.

At 412, once the first timer has expired, UE 102 determines whether the application is still in the background state or whether the application has transitioned back to the foreground state. If the application has transitioned back to the foreground state, UE 102 continues using the dedicated network slice at 405. However, if the application is still in the background state, the process moves to 414.

At 414, based on a determination that the first timer has expired and based on a determination that the application remains in the background state, UE 102 starts a second timer. And at 414, the UE 102 stops using the dedicated network slice and starts using a default network slice for transmitting the data traffic of the application which is the background state. Since the application in the background state generates traffic that requires only a best-effort service (e.g., keep-alive packets), the default network slice should meet the service requirements of the background application.

According to some aspects, the duration of the second timer may depend on the number of applications that are running at UE 102 in the foreground state. In other words, the duration of the second timer may depend on the number of dedicated network slices currently serving UE 102. According to some aspects, the duration of the second timer may be inversely proportional to the number of dedicated network slices currently serving the UE 102. For example, if the number of foreground applications is close to the maximum number of allowed dedicated network slices (e.g., 7 or 8), the duration of the second timer may be set to 15 seconds. If the number of foreground applications is low (e.g., 1, 2, 3), the duration of the second timer may be set to 45 seconds. If the number of foreground applications is 4, 5, or 6, the duration of the second timer may be set to 30 seconds.

At 416, UE 102 determines whether the second timer has expired. If the second timer has expired, the method continues to 420. However, if the second timer has not expired, the method remains at 418 until the second timer expires.

At 418, UE 102 continues using the default network slice. However, UE 102 does not release the dedicated network slice until the second timer expires. However, if the application transitions back to the foreground state before the second timer expires, UE 102 may start using the dedicated network slice to transmit the data traffic generated by the application.

At 420, upon determining that the second timer has expired, UE 102 releases the dedicated network slice resources. Herein, resources can be time and frequency resources utilized for wireless signal transmission with the network. Furthermore, UE 102 continues to use the default network slice as long as the application remains in the background state. Alternatively, if the application transitions to the foreground state after the second timer expires, UE 102 may send a PDU session establishment request to establish a new PDU session with a dedicated network slice for the application. Hence, the second timer serves the purpose of preventing method 400 from prematurely releasing the resources corresponding to the dedicated network slice if the application oscillates between the foreground and background states, for example over a short time period.

FIG. 5 illustrates an exemplary method 500 performed by a UE for differentiating foreground and background data traffic over a network slice, according to some aspects of this disclosure. As a convenience and not a limitation, FIG. 5 may be described with regard to elements of FIGS. 1-4, for example, the functions of FIG. 5 can be performed by UE 102 of FIG. 1 or by UE 302 of FIG. 3. For example, processor 210 can perform, or cause to perform, the functions of FIG. 5 in conjunction with other elements of FIG. 2. Method 500 can also be performed by system 200 of FIG. 2 and/or computer system 600 of FIG. 6. But method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, UE 102 determines whether an application running in a foreground state transitions to running in a background state, where the data traffic corresponding to the application running in the foreground state is routed over a dedicated network slice. According to some aspects, UE 102 may determine whether an application is the foreground or in the background by monitoring the size and the type of packets sent and/or received by the application. For example, if the application transmits HTTP packets or packets corresponding to a streaming or multimedia protocol, the application is determined to be running in the foreground state. If the application only transmits control such as ICMP or ping packets, the application is determined to be running in the background state. According to some aspects, if the traffic generated by the application does not comprise any data packets of size greater than a threshold value, the UE determines that the application is running in the background state. Alternatively, if the traffic generated by the application comprises data packets of size greater than a threshold, the UE determines that the application is running in the foreground state. As an example, the threshold value may equal the maximum possible size of an ICMP packet, and if the traffic generated by the application comprises data packets of size greater than the largest possible ICMP packets, UE 102 determines that the application is running in the foreground state. Accordingly, if the traffic generated by the application does not comprise any data packets of a size greater than the largest possible ICMP packets, the UE 102 determines that the application is running in the background state.

At 504, in response to a determination that the application running in the foreground state transitions to running in the background state, UE 102 starts a first timer and continues to use the dedicated network slice. Therefore, UE 102 routes the background traffic corresponding to the application over the dedicated network slice. According to some aspects, the duration of the first timer may depend on the number of applications that are running at UE 102 in the foreground state. In other words, the duration of the first timer may depend on the number of dedicated network slices currently serving UE 102. According to some aspects, the duration of the first timer may be inversely proportional to the number of dedicated network slices currently serving the UE 102.

At 506, in response to a determination that the first timer has expired and a determination that the application continues to run in the background state, start a second timer and start routing the background traffic corresponding to the application over a default network slice. According to some aspects, the duration of the second timer may depend on the number of applications that are running at UE 102 in the foreground state. In other words, the duration of the second timer may depend on the number of dedicated network slices currently serving UE 102. According to some aspects, the duration of the second timer may be inversely proportional to the number of dedicated network slices currently serving the UE 102. According to some aspects, the second timer serves the purpose of preventing the method 400 from proceeding to subsequent steps when the application oscillates between the background and foreground states, for example over a short time period.

At 508, in response to a determination that the second timer has expired and that the application continues to run in the background state, continue to route the background traffic corresponding to the application over the default network slice and release resources corresponding to the dedicated network slice. Herein, resources can be time and frequency resource elements utilized for wireless signal transmission with the network. UE 102 may continue to use the default network slice as long as the application remains in the background state. Alternatively, if the application transitions to the foreground state after the second timer expires, UE 102 sends a PDU session establishment request to establish a new PDU session with a dedicated network slice for the application.

Figure 6:
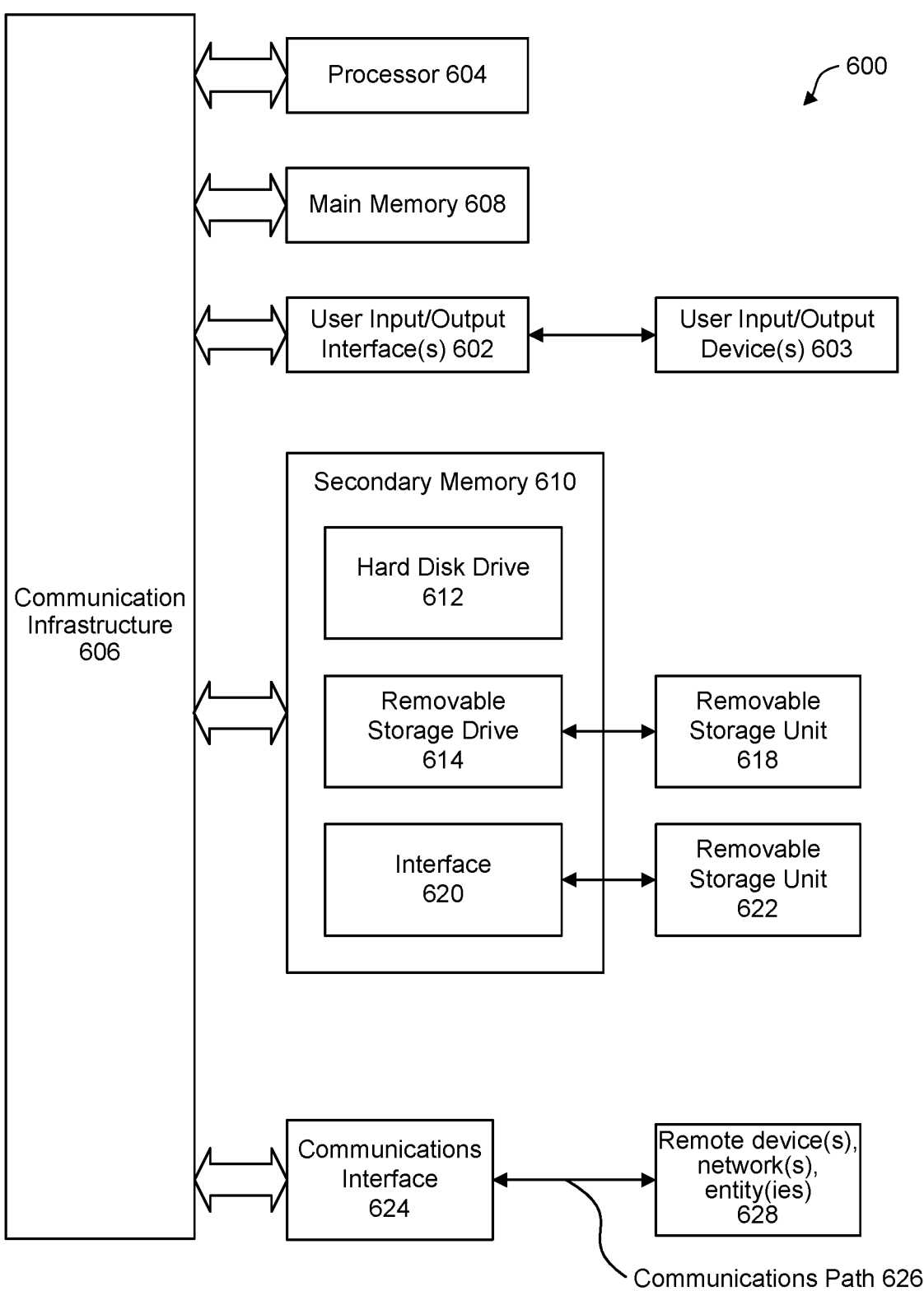
FIG. 6 is an example computer system for implementing some aspects or portion(s) thereof.

Various aspects can be implemented, for example, using one or more computer systems, such as computer system 600 shown in FIG. 6. Computer system 600 can be any well-known computer capable of performing the functions described herein such as UE 102 of FIG. 1. Computer system 600 includes one or more processors (also called central processing units, or CPUs), such as a processor 604. Processor 604 is connected to a communication infrastructure 6010 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication; and
a processor communicatively coupled to the transceiver and configured to:
determine whether an application running in a foreground state transitions to running in a background state, wherein traffic corresponding to the application running in the foreground state is routed over a dedicated network slice;
in response to a determination that the application running in the foreground state transitions to running in the background state, start a first timer and continue to route background traffic corresponding to the application over the dedicated network slice;
in response to a determination that the first timer has expired and a determination that the application continues to run in the background state, start a second timer and start routing the background traffic corresponding to the application over a default network slice; and
in response to a determination that the second timer has expired and that the application continues to run in the background state, continue to route the background traffic corresponding to the application over the default network slice and release resources corresponding to the dedicated network slice.

2. The UE of claim 1, wherein, in response to a determination that the first timer has expired and that the application has transitioned back to the foreground state, the processor is further configured to:
route the traffic corresponding to the application over the dedicated network slice.

3. The UE of claim 1, wherein, in response to a determination that the second timer has expired and that the application has transitioned back to the foreground state, the processor is further configured to:
send a request to establish a new dedicated network slice that is different from the dedicated network slice.

4. The UE of claim 1, wherein a duration of at least one of the first timer or the second timer is determined, in part, based on a number of currently active dedicated network slices at the UE.

5. The UE of claim 1, wherein the background traffic corresponding to the application running in the background state comprises of internet control message protocol (ICMP) keep-alive messages.

6. The UE of claim 1, wherein a user interface (UI) application of the UE indicates whether the application is running in the foreground state or in the background state.

7. The UE of claim 1, wherein the processor is further configured to determine that the application is running in the background state based on the traffic corresponding to the application not comprising any data packets of size greater than a threshold value.

8. The UE of claim 1, wherein the dedicated network slice is an enhanced mobile broadband (eMBB) network slice, an ultra-reliable low latency communications (URLLC) network slice, or a massive machine type communications (mMTC) network slice.

9. A method of operating a user equipment (UE), comprising:
determining whether an application running in a foreground state transitions to running in a background state, wherein traffic corresponding to the application running in the foreground state is routed over a dedicated network slice;
in response to a determination that the application running in the foreground state transitions to running in the background state, starting a first timer and continuing to route background traffic corresponding to the application over the dedicated network slice;
in response to a determination that the first timer has expired and a determination that the application continues to run in the background state, starting a second timer and starting to route the background traffic corresponding to the application over a default network slice; and
in response to a determination that the second timer has expired and that the application continues to run in the background state, continuing to route the background traffic corresponding to the application over the default network slice and releasing resources corresponding to the dedicated network slice.

10. The method of claim 9, wherein, based on a determination that the first timer has expired and that the application has transitioned back to the foreground state, further comprising:

routing the traffic corresponding to the application over the dedicated network slice.

11. The method of claim 9, wherein, based on a determination that the second timer has expired and that the application has transitioned back to the foreground state, further comprising:

sending a request to establish a new dedicated network slice that is different from the dedicated network slice.

12. The method of claim 9, wherein a duration of at least one of the first timer and the second timer is determined, in part, based on a number of currently active dedicated network slices at the UE.

13. The method of claim 9, wherein the background traffic corresponding to the application running in the background state comprises of internet control message protocol (ICMP) keep-alive messages.

14. The method of claim 9, wherein a user interface (UI) application of the UE indicates whether the application is running in the foreground state or in the background state.

15. The method of claim 9, wherein the UE determines that the application is running in the background state based on the traffic corresponding to the application not comprising any data packets of size greater than a threshold value.

16. A non-transitory computer-readable medium (CRM) having instructions stored thereon that, when executed by a processor of a user equipment (UE), causes the UE to perform operations comprising:

determining whether an application running in a foreground state transitions to running in a background state, wherein traffic corresponding to the application running in the foreground state is routed over a dedicated network slice;

in response to a determination that the application running in the foreground state transitions to running in the background state, starting a first timer and routing background traffic corresponding to the application over the dedicated network slice;

in response to a determination that the first timer has expired and a determination that the application continues to run in the background state, starting a second timer and starting to route the background traffic corresponding to the application over a default network slice; and in response to a determination that the second timer has expired and that the application continues to run in the background state, continuing to route the background traffic corresponding to the application over the default network slice and releasing resources corresponding to the dedicated network slice.

17. The non-transitory CRM of claim 16, wherein, based on a determination that the first timer has expired and that the application has transitioned back to the foreground state, the operations further comprising:

routing the traffic corresponding to the application over the dedicated network slice.

18. The non-transitory CRM of claim 16, wherein, based on a determination that the second timer has expired and that the application has transitioned back to the foreground state, the operations further comprising:

sending a request to establish a new dedicated network slice that is different from the dedicated network slice.

19. The non-transitory CRM of claim 16, wherein a duration of at least one of the first timer and the second timer is determined, in part, based on a number of currently active dedicated network slices at the UE.

20. The non-transitory CRM of claim 19, wherein the background traffic corresponding to the application running in the background state comprises of internet control message protocol (ICMP) keep-alive messages.

* * * * *